United States Patent Office 3,284,279
Patented Nov. 8, 1966

3,284,279
MICROCRYSTALLINE WAX SUBSTITUTE
George G. Rumberger, Portage Township, Kalamazoo County, Mich., assignor, by mesne assignments, to Brown Company, New York, N.Y., a corporation of Delaware
No Drawing. Filed Nov. 15, 1962, Ser. No. 238,044
The portion of the term of the patent subsequent to July 13, 1982, has been disclaimed
8 Claims. (Cl. 161—235)

This invention relates to a composition comprising paraffin wax which can be substituted for microcrystalline waxes. More particularly, this composition is a novel material which can be used to coat or laminate sheet materials to obtain most of the desirable characteristics of microcrystalline wax coatings and laminates, without some of the attendant difficulties. More specifically, this invention relates to a composition of a paraffinic distillate hydrocarbon wax modified with crystalline polyethylene and amorphous atactic polypropylene.

In specific applications of the invention it is used to laminate or coat sheet materials to adhesively secure two sheet materials with a highly moisture vaporproof composition, or provide a sheet material with a heat sealable high strength coating.

For many years it has been desirable to use paraffin wax, that is, wax obtained from the overhead distilled fractions of petroleum, as a basic ingredient in the lamination of sheet materials, and in the coating of sheet materials, due to its inherent low water vapor permeability. In spite of the fact that many additives have been suggested to improve the properties of paraffin wax for these purposes, good results have not been obtained, as most of the materials suggested have either not resulted in attaining the desired adhesion to the various substrates, especially high density surfaces such as cellophane, glassine, parchment, and the like, or even fibrous material such as paper and paperboard, even when the additives are used in large amounts, and have seriously detracted from the inherent water vapor permeability of the paraffin wax. In some cases paraffin wax has been successfully employed in a mixture with microcrystalline wax, which is obtained from residual stocks remaining after distillation off of the fractions containing the aforesaid paraffin wax, for fibrous sheet materials, along with certain additives, but in practically all instances these admixtures have required the use of considerable proportions of microcrystalline wax along with the additives. As pointed out by Dreyman in his U.S. Patent 2,031,036 (issued February 18, 1936), it is even necessary in some instances to further fortify microcrystalline waxes, or amorphous waxes, in order to obtain the desired adhesion when laminating sheet materials. In the coating of sheet materials, various additives have been employed with paraffin wax, but these have necessarily had to be accompanied by the addition of microcrystalline wax to obtain good properties, and even so, good adhesion to high density surfaces has not been attained. More recent developments have shown that the so-called intermediate waxes, that is distillate waxes having a high refractive index, could be blended with very carefully selected polyethylenes and microcrystalline wax to obtain high seal strength materials. However, this has required exclusion of a wide range of polyethylenes and paraffin waxes, and these blends have not proven successful with high density surfaces such as regenerated cellulose, glassine, parchment papers, and the like. I have now found that the paraffin waxes can be used in compositions which duplicate in most respects the desirable properties of microcrystalline waxes, and avoid some of the inherent disadvantages of the microcrystalline waxes, namely the low blocking point, and high friction. I have, moreover, found that the distillate paraffin waxes having a refractive index relationship to melting point as expressed by the formula $n_D^{212° F.}$ equals $.0001943t + 1.4050$, where $t$ is the congealing point in degrees Fahrenheit as determined by ASTM Method D938–49, as the upper limit of refractive index, can now be used in my novel compositions. These are ordinarily the paraffin waxes as known in commerce, and are obtained by refining distillate portions of crude petroleum, or made synthetically by synthesis, such as the synthesis of carbon monoxide and hydrogen and will have a melting point of from 120 to 200° F. Along with the paraffin waxes I use from about 1 to about 20 percent of crystalline polyethylene having a weight average molecular weight range of from about 2,000 to about 40,000, and a solid density at 20° C. of from about .910 to about .982. These are the so-called unbranched or crystalline polyethylenes, arising from the polymerization of ethylene, with or without added monomeric content, and may be telomers of ethylene and isopropyl alcohol, or any other crystalline polymer of ethylene containing more than 80 percent ethylene as a basic monomer, and a solid density of over .910. Such ethylene polymers have been well described in the art, and it is recognized that these materials may be synthesized by high pressure polymerization of ethylene in the presence of oxygen or free radical catalyst, or can be produced at moderate pressures in the presence of certain well known catalytic materials. Since molecular weight is difficult to determine for this class of compound, a viscosity parameter as defined by ASTM Method D1238–57T, melt index, is commonly used to designate these materials. The polyethylenes I prefer will have a melt index of from about .2 to above 950. Materials above 500 melt index are commonly designated by their melt viscosity and may range from about 550 to 30,000 centipoise when measured at 150° C. Materials of this nature are relatively insoluble in ethylene dichloride up to 120° F. or higher.

In addition to the polyethylene I use from two to fifty percent of an atactic, or amorphous, polypropylene, the ratio of amorphous-polypropylene to the crystalline polyethylene always being from about 1:1 up to 5:1. The atactic, or amorphous, polypropylenes used in these compositions results from the catalytic polymerization of propylene, with or without added monomers, but are characterized by the fact that they show no crystalline structure, or substantially no crystalline structure, and are rubbery solid materials. It is believed that these materials are randomly branched, having no unbranched chain elements in the molecular longer than 18 angstrom units, and are characterized by a solid density at 20° C. of from about .75 to about .89, and molecular weight range of from approximately 2,000 to 100,000 as determined by the method of Staudinger (for a description of this method, see article by A. R. Kemp and H. Peters in Industrial and Engineering Chemistry, vol. 35, pp. 1108–1112, 1943). Such polymers are soluble, even at room temperature in a wide variety of solvents. These polymers can be prepared directly by using various catalysts as are well known in the art (refer to Encyclopedia of Chemical Technology, second supplement, published by the Interscience Encyclopedia, Inc., New York, 1960, pp. 661–669), or by extraction from polymer compositions produced by certain non-specific catalysts, the amorphous or atactic polypropylenes being thus removed from the crystalline polypropylenes which are for the most part isotactic or syndiotactic. In some cases it is possible to prepare a proper mixture of isotactic polypropylene and atactic polypropylene, in which the two occur in correct proportions, to add directly to paraffin wax to improve its properties.

Table I shows a list of various crystalline polyethylenes I have found useful in the practice of my invention, and Table II shows a list of amorphous polypropylenes which are used to accompany the use of the crystalline polyethylenes, in the ratios as hereinbefore prescribed.

TABLE I.—CRYSTALLINE SOLID POLYMERS

| | Type | Trade Name | Melt Index | Density at 20° C. | Approximate Molecular Weight |
|---|---|---|---|---|---|
| A | High Pressure Polyethylene. | DYLT | 300 | .912 | 12,000 |
| B | High Pressure Polyethylene. | DYNH | 2 | .925 | 21,000 |
| C | Ziegler Polyethylene | Marlex 6000 | 5 | .960 | 15,000 |
| D | Telomer-Ethylene Isopropanol. | AC 6 | 1,000 | .920 | 2,000 |
| E | High Pressure Polyethylene. | C-11 | 815 | .947 | 10,000 |
| F | Isotactic Polypropylene. | Experimental | 1-2 | .953 | 70,000 |
| G | Fischer Tropsch | Experimental | 1,000 | .946 | 2,500 |

TABLE II.—AMORPHOUS POLYPROPYLENES

| | Average Molecular Weight | Density | Melt Viscosity-Poise |
|---|---|---|---|
| A | 9,000 | .80 | 150 at 150° C. |
| B | 12,000 | .82 | 1000 at 150° C. |
| C | 6,000 | .79 | 10 at 150° C. |
| D | 50,000 | .86 | 100,000 at 150° C. |
| E | 32,000 | .84 | 60,000 at 150° C. |

For a fuller understanding of my invention the following examples set forth certain embodiments thereof, which are meant to be illustrative, and not limiting.

*Example 1*

Seventy-five parts of a paraffin-type wax having a congealing point of 158.5° F. and a refractive index of 1.4338 at 212° F. was melted and to this was added ten parts of polyethylene having a weight average molecular weight of approximately 12,000 and a solid density of .910 and stirred together at a temperature of 250° F. until the polyethylene was completely dissolved in the wax. To this was added fifteen parts of an amorphous atactic polypropylene having a solid density of .80 gram per cubic centimeter at 20° C., a ring and ball softening point of 95° C., and a Brookfield viscosity at 150° C. of 15,000 centipoise, and a calculated molecular weight range of from about 2,000 to about 24,000, with a number average molecular weight of 10,000. When completely blended together the composition had a melting point of 195.0° F. as determined by ASTM D-127, a penetration at 77° F. of 10 as determined by ASTM Method D5-25, a color as determined by the NPA Method of 1. The composition was coated on 27-lb. parchmentized paper, and found to have a staining temperature of 139° F., a laminating strength of 50 grams per centimeter. By comparison, a laminating grade of microcrystalline wax containing 4% butyl rubber dissolved therein at a melting point of 174.8° F., penetration of 24, a color of 3NPA, a staining temperature of 117, and a laminating strength of 53 grams per centimeter. Sealing or laminating strength is determined as follows on sheets laminated with the composition:

Cut at least 5 test specimens 4 inches wide from the laminated sample web, allowing a ½ inch trim on each edge of the specimen. The length of the test specimen shall not be less than 6 inches, but may be longer if desired. The test specimens shall be conditioned in accordance with TAPPI Standard T–402m for 16 hours before testing. Separate manually the two plies along the first inch of a test specimen and clamp the end of each ply in the jaw or clamp of the testing machine, taking care that they are properly aligned. Start the testing machine and separate the plies so that the ends being separated are in the same plane, at an angle of 180°, with the unseparated portion at right angles to this plane. At intervals of 10 seconds or more, take 5 readings of the grams force required to continue the separation of the laminated plies. Discard the results from any specimen whose test result is due to some obvious flaw, and make another test.

Average the five readings for each specimen and divide this average by 10 to give the force in grams per centimeter.

It is generally conceded that for most laminating and coating of sheet materials, the laminating strength should exceed 10 grams per centimeter, when tested on a high density surface such as glassine or parchment, or 10 grams per centimeter when tested as a surface coating for heat sealing purposes. The following tabulation in Table III shows the sealing strength attained on various compositions when tested on parchment paper, and also on a coated 25-lb. sulphate bread wrapper stock.

TABLE III

| | | Seal Strength, g./cm. | | | Blocking Point | CPS Viscosity at 210° F. |
|---|---|---|---|---|---|---|
| | | Parchment | Sulphite Waxing Stock | Ratio | | |
| 1 | 10% Crystalline Polymer A<br>15% Amorphous Polypropylene A<br>75% Paraffin, 158.5° F. M.P. Refractive Index at 212° F., 1.4338. | 80 | 95 | .84 | 130 | 203 |
| 2 | 5% Crystalline Polymer B<br>15% Amorphous Polypropylene B<br>80% Paraffin, 136° F. M.P. Refractive Index at 212° F., 1.4234. | 11 | 11 | 1.00 | 132 | 380 |
| 3 | 5% Crystalline Polymer B<br>25% Amorphous Polypropylene A<br>70% Paraffin, 136° F. M.P. Refractive Index at 212° F., 1.4234. | 10 | 13 | .77 | 128 | 250 |
| 4 | 2% Crystalline Polymer D<br>3% Amorphous Polypropylene A<br>95% Paraffin 158.5° F. M.P. Refractive Index at 212° F., 1.4338. | 35 | 54 | .65 | 146 | 14 |
| 5 | 2% Crystalline Polymer C<br>10% Amorphous Polypropylene C<br>88%, 135/37 M.P. Paraffin | 15 | 17 | .88 | 140 | 196 |
| 6 | 5% Crystalline Polymer G<br>5% Amorphous Polypropylene E<br>90%, 135/37 M.P. Paraffin | 50 | 80 | .62 | 136 | 410 |

As shown from the tables, it will be seen that the use of major portions of paraffinic-type waxes with crystalline polyethylenes having a density in excess of .910 together with amorphous atactic polypropylenes results in unexpectedly good sealing and laminating strengths, with adequate staining temperatures, and are an improvement over the microcrystalline waxes ordinarily used for coating and laminating purposes. It has been found that if the adhesion to high density surfaces, such as parchment, is 50% of the adhesion to more fibrous low density structures such as ordinary waxing grades of paper, the composition is suitable for both coating and laminating over a broad range of substrates.

In addition to use of the compositions of this invention in direct application to surfaces of sheet materials, and as an adhesive for laminating sheet materials, they may also be used to replace microcrystalline wax in various compounds or formulations, such as in compounding heat sealing labels, specialty wrappers, such as cheese wrappers comprising cellophane coated on one side or both sides with a wax composition, or in use with microcrystalline waxes or intermediate paraffin waxes. I have found that a simple test conducted with solvents is adequate to describe the characteristics of the compositions as herein disclosed, whether these compositions are original blends of the materials, or removed by mechanical means from the surfaces or from between sheet materials, such as by scraping. In characterizing such materials I dissolve the composition in ethylene dichloride by heating, then cool the composition to zero degrees Fahrenheit and filter the resulting solution from the precipitated matter, then wash the filter cake obtained thoroughly with ethylene dichloride at zero degrees Fahrenheit. Since the amorphous atactic polypropylene is soluble even at low temperatures in such solvents, it remains in the main filtrate and wash solutions. This can be recovered and weighed to determine the percentage of atactic polymer present. To determine the percentage of crystalline polyethylene in a composition it can be dissolved in a mixture of 50% methyl isobutyl ketone and 50% toluene, by refluxing a sample with this solvent mixture, then it is cooled to 120° F., at which point the crystalline polyethylene will precipitate out, and can be filtered off. After drying, it can be weighed to determine the percent crystalline polyethylene present.

In both the determination of the amorphous polypropylene and the crystalline polyethylene a ratio of solvent to composition of 20:1 by volume will be used.

The amount of paraffin wax, crystalline polymer, and atactic polymer in the composition can be determined by a combination of these methods, using ethylene dichloride as the only solvent. In this case 20 parts by volume of ethylene dichloride to one part by volume of sample is added, the sample heated to reflux, the solution cooled to 120° F., and the polyethylene is filtered off and washed with a second 20 parts of solvent at 120° F. The remaining combined filtrates are then cooled to zero degrees Fahrenheit and the solution again filtered and washed. This precipitates the paraffin wax, which can be properly identified by melting point and refractive index measurements. The atactic polymer remains dissolved in the ethylene dichloride, and can be recovered by distillation or evaporation of the solvent and weighed.

As hereinbefore stated, the amount of atactic amorphous polypropylene to the amount of crystalline polyethylene should be in a ratio of from about 1:1 to 5:1. Using the above analytical methods these ratios have been found to maintain when testing known compositions. In place of atactic polypropylene, I may use other atactic non-crystalline amorphous polymers, notable those which are soluble, or will stay in solution, in 20 parts of ethylene dichloride by volume at zero degrees Fahrenheit. These will include such material as propylene-isoprene polymers, isoprene polymers, certain natural rubbers, and copolymers of the stated monomers. As a crystalline high density polymer to be used in place of polyethylene, I may use isotactic polypropylenes, especially those in the molecular weight range of from 10,000 to 100,000 molecular weight, polymethylenes, the so-called Fischer-Tropsch waxes, which are the synthesis product of carbon monoxide and hydrogen, or other isotactic high density crystalline hydrocarbon polymers which may be synthesized in the future, but which are insoluble in ethylene dichloride at 120° F.

Although I do not completely understand why the compositions as aforedescribed are unusual in their adhesion to various substrates and in their other desirable properties as exhibited by the examples, it is my opinion that, upon cooling a melt of the composition, the high density crystalline polymer portion crystallizes first, followed by or accompanied by the paraffin wax, and that the crystals and co-crystals thus formed are completely surrounded by a film of amorphous atactic polymer.

Having herein described the unique properties of my composition, and the limits thereof, I claim:

1. A thermoplastic composition suitable for laminating and coating sheet materials consisting essentially of from one to about 20 percent by weight of crystalline polyethylene having an average molecular weight of from 2,000 to 40,000 and a solid density at 20° C. of from .910 to .982, from about two to about 50 percent by weight of amorphous atactic polypropylene having an average molecular weight of from about 2,000 to 100,000 and a solid density at 20° C. of from .75 to .89, and from 30 to about 97 percent by weight of a paraffinic petroleum distillate wax having a melting point of 120° F. to 200° F., the ratio of the said atactic polypropylene to the crystalline polyethylene in the composition being in the range of 1:1 to 5:1.

2. A composition suitable for laminating and coating sheet materials consisting essentially of from one to about twenty percent by weight of a crystalline hydrocarbon polymer having an average molecular weight of from 2,000 to 40,000 and a density above .910, from two to about 50 percent by weight of an amorphous atactic polypropylene having an average molecular weight of from 2,000 to 100,000 and a solid density at 20° C. of from .75 to about .89, and the balance of the composition consisting essentially of distillate petroleum paraffinic wax having a melting point of 120° F. to 200° F., wherein the ratio by weight of amorphous atactic polypropylene to crystalline hydrocarbon polymer is in the range of about 1:1 to 5:1.

3. Two or more cellulosic sheet materials laminated together with the composition of claim 1.

4. A cellulosic sheet material coated with a composition of claim 1.

5. A composition suitable for laminating and coating sheet materials consisting essentially of from about one to about 20 parts by weight of crystalline hydrocarbon polymer having an average molecular weight of from about 2,000 to about 40,000 and a density at 20° C. of from .910 to .960, from two to about 50 parts by weight of an amorphous atactic polypropylene polymer having an average molecular weight of from about 2,000 to about 100,000 and a solid density at 20° C. of from .75 to .89, and from about 50 to about 97 percent of a paraffinic distillate petroleum wax having a melting point of from 120° F. to 200° F. composition.

6. Two or more sheet materials laminated together with the composition of claim 5.

7. Two sheet materials, at least one of which is cellulosic, laminated together with the composition of claim 5.

8. The laminated sheet materials of claim 6, at least one of which is a high density cellulosic sheet selected from the group consisting of parchmentized paper, glassine, and regenerated cellulose.

References Cited by the Examiner

UNITED STATES PATENTS 3,085,026 4/1963 Weisgerber et al. __ 161—235 X
3,172,801 3/1965 Cantelow _____ 161—235 X
3,194,469 7/1965 Rumberger _____ 161—235 X EARL M. BERGERT, *Primary Examiner.*

HAROLD ANSHER, *Examiner.*

C. B. COSBY, *Assistant Examiner.*